United States Patent [19]
Kiyono et al.

[11] 3,799,718
[45] Mar. 26, 1974

[54] APPARATUS FOR PRODUCING A THERMOPLASTIC RESIN SHEET HAVING A COLOR BAND

[75] Inventors: Hiroshi Kiyono, Kyoto; Junichi Nakashima; Yasuyuki Fujisaki, both of Shiga; Yukio Ishigaki, Otsu; Gen Endo, Kusatsu, all of Japan

[73] Assignee: Sekisui Kagaku Kogyo Kabushiki Kaisha, Osaka, Japan

[22] Filed: Dec. 16, 1971

[21] Appl. No.: 208,806

Related U.S. Application Data

[62] Division of Ser. No. 55,763, July 17, 1970, Pat. No. 3,715,420.

[30] Foreign Application Priority Data
July 19, 1969 Japan.............................. 44-57208

[52] U.S. Cl. .................................................. 425/131
[51] Int. Cl. .......................... B29c 21/00, B29f 1/12
[58] Field of Search............................ 425/131, 132

[56] References Cited
UNITED STATES PATENTS
3,565,737  2/1971  Lefevre et al................... 425/131 X

*Primary Examiner*—Richard B. Lazarus
*Attorney, Agent, or Firm*—Sherman and Shalloway

[57] ABSTRACT

A process for producing a thermoplastic resin sheet having a band of color by feeding a molten thermoplastic resin by an extruder into a sheet-forming flat die having a manifold and extruding said molten resin from an extrusion opening of said flat die, which comprises forcing a stream of a colored molten thermoplastic resin through at least one injection port opened into the manifold of the flat die into a main stream of the molten resin extruded from the extruder and fed to the manifold, associating the main stream of the molten thermoplastic resin and the stream of the colored molten thermoplastic resin within the manifold, and extruding the associated streams from the extrusion opening of said flat die.

6 Claims, 10 Drawing Figures

APPARATUS FOR PRODUCING A THERMOPLASTIC RESIN SHEET HAVING A COLOR BAND

This is a division of application Ser. No. 55,763, filed July 17, 1970 now U.S. Pat. No. 3,715,420.

This invention relates to a process and an apparatus for producing a thermoplastic resin sheet having a color band.

Heretofore, a laminated safety glass comprising two opposing glass sheets and an interlayer of a sheet of a thermoplastic resin such as plasticized polyvinyl butyral interposed therebetween has been used as windshields of automobiles, airplanes and the like or window panes of buildings. The interlayer is produced usually by heating, kneading and melting a thermoplastic resin by means of an extruder, introducing the molten resin into a mold for shaping it into a sheet-like form, and extruding it through an extrusion opening to shape it into a sheet. The interlayer so obtained is generally colorless and transparent, and permits transmission of most of the light. So when it is used as a windshield of a vehicle such as an automobile, the driver receives sunlight directly on his face with the effects of glare.

For restricting the transmission of light through the windshield and impart an anti-glare effect to it, it is the practice to color the interlayer with a dyestuff or pigment in various colors such as bluish green either entirely or partially so as to form a color band. When coloring the interlayer partially, it is desirable to provide a color gradient between a colored part and a non-colored parts, making the color progressively lighter in shade towards the non-colored part and thus obtaining a gradually fading effect.

The production of a sheet having a color gradient between a colored part and a non-colored part by means of an extruder is known by U.S. Pat. No. 3,405,425. According to the method disclosed in the U.S. Patent, a pigmented molten thermoplastic resin is forced vertically through a plurality of discharge tubes onto the main stream of a molten thermoplastic resin at a part immediately before the extrusion opening of the sheet-forming die. The amount of the colored thermoplastic resin to be forced through each of the discharge tubes is controlled so as to provide a color gradient in the widthwise direction of the sheet being extruded. In this method, the width of a color band resulting from the discharge of the colored thermoplastic resin through the respective discharge tube is substantially equal to the diameter of the discharge tube in the widthwise direction of the sheet being extruded. The method, however, requires a complicated apparatus and a strict control of the amounts of the colored thermoplastic resin, leading to a troublesome operation. Furthermore, according to this method, it is difficult to maintain the amount of the resin forced through each of the discharge tubes constant for a long period of time since the colored resin is introduced simultaneously from a number of discharge tubes. Consequently, it is difficult to produce a sheet having a constant color gradient in its widthwise direction with good stability over a long period of time.

The object of the present invention is to provide a process and an apparatus for the continuous and steady production of a thermoplastic resin sheet having a color band with a gradually fading color gradient between a colored part and a non-colored part, especially a sheet of plasticized polyvinyl butyral used as interlayers of glass laminates.

The invention will be more specifically described with reference to the accompanying drawings in which:

FIG. 8 shows the sections in the widthwise direction of three sheets A, B and C having a color band obtained by the process of the invention.

Figure 1:
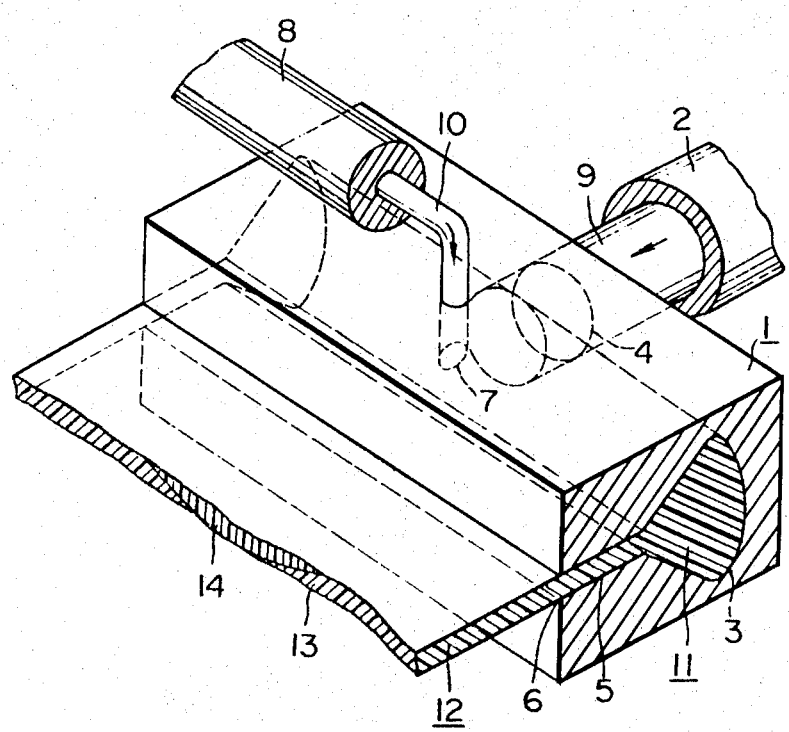
FIG. 1 is a perspective view showing schematically one example of producing a sheet having a color band by forcing a colored molten thermoplastic resin into a sheet-forming flat die having a manifold system.

Referring to FIG. 1, a flat T die 1 is connected to an extrusion opening of an extruder not shown, and provided with a resin inlet pipe 2 for feeding a main stream 9 of a molten thermoplastic resin to the flat T die, a manifold 3, a passage 4 for conducting the main stream of molten resin, said passage being opened into the manifold 3, a die-land 5 subsequent to the manifold 3, a die extrusion opening or die lip 6, and an injection port 7 for a stream 10 of a colored molten thermoplastic resin, said injection port being opened into the manifold 3 and connected to an injection pipe 8 for the colored molten resin connected to a device for feeding the stream 10 of the colored molten resin, such as an extruder or pump (not shown).

It has now been found that a sheet of a thermoplastic resin having a good color gradient is obtained by providing at least one injection port 7 for the stream of a colored resin in the manifold 3 and injecting a stream of a colored resin under pressure towards a main stream of a resin flowing in the extrusion and widthwise directions in the manifold 3. The flowing action of the main stream of the resin within the manifold 3 leads to the gradually fading of color.

The main stream 9 of the resin extruded by an extruder in accordance with the present invention is conducted to the flat die 1, and filled in the manifold 3. On the other hand, a stream 10 of a colored resin is forced by a forcing device (not shown) through the injection pipe 8, and injected into the main stream 11 of the resin within the manifold from at least one injection port 7. The stream of the resin is then rectified by means of the die-land 5, and extruded through the die extrusion opening 6 into a sheet 12 consisting of a thermoplastic resin 13 and a colored thermoplastic resin 14.

Figure 2:
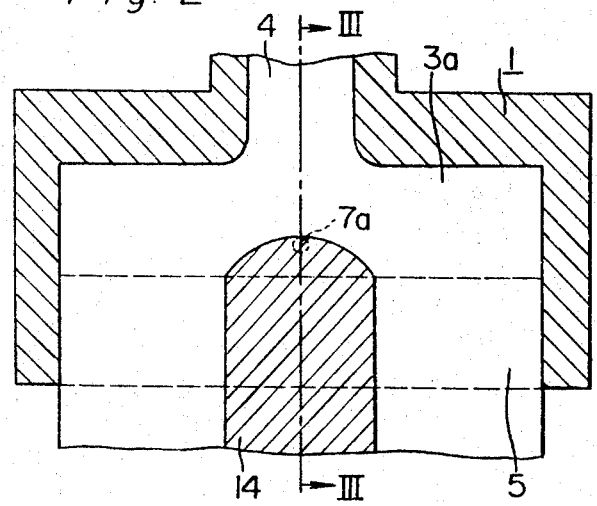
FIG. 2 is a transverse sectional view of a flat die of a different type from that shown in FIG. 1, which shows a stream of a colored molten thermoplastic resin forced through an injection port opened into a manifold.
Figure 3:
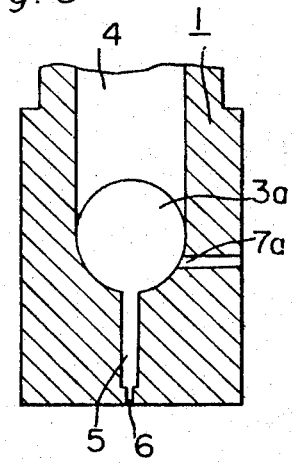
FIG. 3 is a sectional view of the flat die shown in FIG. 2, taken along the line III—III' of FIG. 2.

The flat T die 1 shown in FIGS. 2 and 3 includes a passage 4 for introduction of a molten resin, a manifold 3a of a vertical section, a circular injection port 7a, a die-land 5 subsequent to the manifold 3a, and a die extrusion opening or die lip 6. A colored resin 14 injected into the manifold 3a of the flat T die appears symmetrically in the widthwise direction of the resulting sheet, and a sheet 12 having a cross section shown in FIG. 8-A is obtained. In the flat T die 1 shown in FIGS. 4 and 5, a circular injection port 7a is provided at a position slightly away from the center of the manifold in its widthwise direction. The section of the manifold 3b is not circular, and its portion near the die-land 5 is gently inclined in a straight line against its horizontal surface and terminates in the die-land 5. The angle of inclination to the horizontal surface is 15° to 60°, preferably 30° to 45°. The use of a flat die having a gentle angle of inclination results in a less disorder of a flow of molten resin in the extrusion direction at the inlet portion of the die-land, and it is possible to extrude a sheet of good quality steadily.

Figure 4:
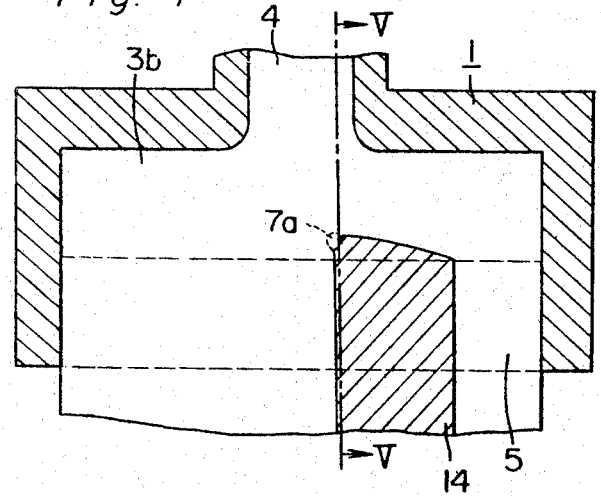
FIG. 4 is a transverse sectional view of a flat die of another type, which shows a stream of a colored molten thermoplastic resin forced through an injection port opened into a manifold.
Figure 5:
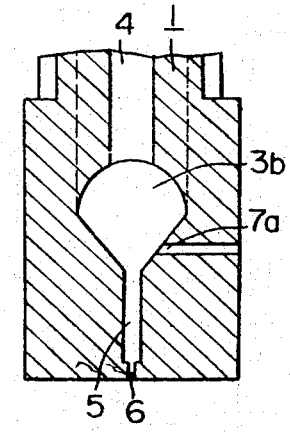
FIG. 5 is a sectional view of the flat die shown in FIG. 4, taken along the line V—V' of FIG. 4.

A sheet extruded by means of the flat T die shown in FIGS. 4 and 5 has a section shown in FIG. 8-B. Since the injection port 7a is provided at a position slightly away from the center of the namifold in its widthwise direction, the section of the sheet assumes a form such that the colored resin 14 forced from the injection port 7a is spread in one flowing direction of the main resin stream within the manifold 3b.

Figure 6:
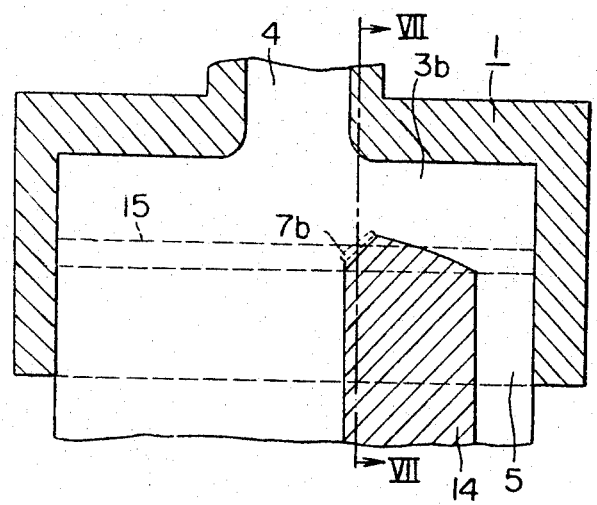
FIG. 6 is a transverse sectional view of a flat die of still another type, which shows a stream of a colored molten thermoplastic resin forced through an injection port opened into a manifold.
Figure 7:
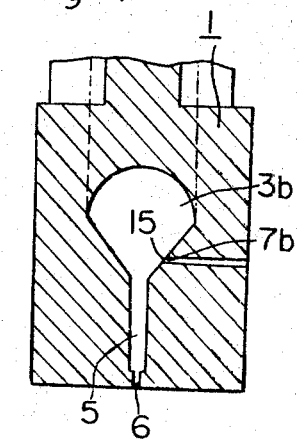
FIG. 7 is a sectional view of the flat die shown in FIG. 6, taken along the line VII—VII' of FIG. 6.
Figure 7:
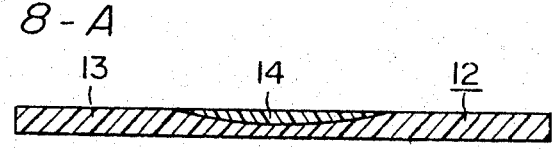
Figure 7:
Figure 7:

In FIGS. 6 and 7, the horizontal section of an injection port 7b opened into a manifold 3b has a shape of ellipse elongated in the direction of the major axis or a shape resembling a vertical section of a wing of an airplane. The injection port 7b is positioned at a certain angle to a dotted line 15 being parallel to the central axis and passing the center of the injection port 7b of the manifold. As is shown in FIG. 6, the angle is such that the end of the injection port 7b near the center of the manifold 3b is nearer to the die-land than the other end. In other words, the end of the injection port positioned upstream of the flow of resin within the manifold in the widthwise direction of the manifold is nearer to the die-land than the other end of the injection port. This angle is in the range of 0° to 90°, preferably 0° to 45°. By forcing a colored molten resin from an injection port of the shape and inclination angle described above, there can be obtained a sheet having a color band of larger width with a more gradual color gradient as compared with the case where the colored resin is introduced from a circular injection port.

The section of the sheet extruded from the flat die shown in FIGS. 6 and 7 is illustrated in FIG. 8-C.

The shape of the injection port may be circular, triangular or square. To obtain a good color gradient and an adequate width of a colored portion, it is preferred to use such shapes as circle, ellipse, crooked ellipse, ellipse with one side elongated in the direction of the major axis, for instance, a shape resembling the vertical section of a wing of an airplane, crescent, or a symmetrical half of a crescent.

In the present invention, any type of extruder capable of heat-melting and extruding a thermoplastic resin can be used, and the examples are a single screw type or a twin screw type. As the sheet-forming flat die, there can be conveniently used such flat dies as a center-fed die (T die) and an end-fed die (L die).

An extruder is used as means for forcing the colored resin continuously into the manifold, and when the colored resin is of low viscosity, pumps are employed conveniently for this purpose.

The thermoplastic resins used in the present invention mean synthetic resins capable of being melted by heat, and included are, for instance, polyethylene, polypropylene, polystyrene, polycarbonate, polyvinyl chloride, polyamides, polyvinyl butyral, polyacrylates, and polyesters. The thermoplastic resin which forms the main stream in the flat die may be the same as or different from the colored thermoplastic resin; preferably both are polyvinyl butyral. When different kinds of resins are used for both, it is preferred that both have good compatibility.

The thermoplastic resins used in the invention may contain suitable plasticizers such as triethylene glycol di-(2-ethyl butyrate), triethylene glycol dihexoate, glyceryl monoleate, dibutyl sebacate, and di-($\beta$-butoxy ethyl) adipate dialkyl phthalates, or fillers.

Suitable coloring agents used in the invention are any types of dyestuffs and pigments which have superior resistance to heat during the sheet-forming operation and to weather. The examples of the coloring agents include dyestuffs of the azo, anthraquinone, and quinoline types, and pigments such as titanium dioxide, carbon black, ultramarine blue, medium chrome green, medium chrome yellow, cadmium red, molybdate orange, phthalocyanine derivatives, and indanthrene derivatives. The use of the azo type dyes, anthraquinone type dyes and quinoline type dyes is convenient in the present invention since it ensures the production of a sheet having a uniform color and change in density because of their good dispersibility or diffusibility in the thermoplastic resin. These dyes and pigments may be used either alone or in admixtures of two or more.

If the main stream 9 of a molten thermoplastic resin extruded from an extruder is colored in a certain color, a stream 10 of a resin to be forced through the injection port 7 should be colored in a color different from that of the main stream 9 of thermoplastic resin.

The preferred amount of the colored resin is about 3–30 percent by weight based on the amount of a sheet extruded from the extrusion opening of the flat die. By forcing the colored resin of the above-specified amount into the manifold, a thermoplastic resin sheet having a color band can be produced in a steady condition. If the amount of the colored resin is outside the range specified above, a band of color appearing on the sheet being extruded tends to fluctuate in density, and it is somewhat difficult to extrude the sheet with the change in color maintained uniform for a long time in the widthwise direction of the sheet.

The viscosity of the resin stream is in the range of $5 \times 10^3$ to $1 \times 10^5$ poises, preferably in the range of $1 \times 10^4$ to $6 \times 10^4$ poises. The pressure at which the colored resin is introduced ranges from 25 to 500 Kg/cm$^2$, preferably from 50 to 400 Kg/cm$^2$.

The invention will further be described by the following illustrative examples which in no way limit the invention.

Example 1

A mixture consisting of 100 parts by weight of polyvinyl butyral and 40 parts by weight of polyethylene glycol di-(2-ethyl butyrate) was kneaded and melted by an extruder, and fed to a sheet-forming T die of the type illustrated in FIGS. 2 and 3 at an extrusion rate of 35 Kg/hr. The T die 1 had an passage 4 for molten resin connected to the extrusion opening of the extruder, a manifold 3a having a diameter of 1.57 inches and a circular section shown in FIG. 3 in which the center line crosses the center line of the inlet 4 at right angles and the length is 32 inches in total extending each 16 inches on both sides of the intersecting point of both center lines, a die-land 5 subsequent to said manifold, and die lip 6 with a clearance of 20 mils. An injection port 7a having a diameter of 78.8 mils is provided at a central position in the widthwise direction of the manifold. The injection port 7a is connected to an extrusion opening of an extruder smaller in size than the above extruder. A mixture consisting of 100 parts by weight of polyvinyl butyral, 40 parts by weight of polyethylene glycol di-(ethyl butyrate) and 0.2 parts by weight of a dark green dyestuff (a mixture of an anthraquinonic dye and an azo dye and consisting specifically of 5 parts of Sumiplast Blue OA, 2 parts of Sumiplast Red FB, and 3 parts of Sumiplast Yellow FC, all being the tradenames of the dyes produced by Sumitomo Chemical Co., Ltd., Japan) was kneaded and melted by this smaller extruder, and forced continuously into the manifold at a rate of 5 Kg/hr through the injection port.

A sheet extruded from the die lip of the T die was cooled while being slightly stretched in the extrusion direction, and a polyvinyl butyral sheet having a band of color 30 inches in width and 15 mils in thickness was obtained at a rate of 40 Kg/hr. The color was most dense at the central part of the sheet in its widthwise direction and became progressively lighter away from the center. The color gradient or change in color density was substantially the same for both sides of the central part. The color gradient of the sheet obtained above was as shown in FIG. 8-A. The light transmission at a point of the sheet apart from one end of the sheet by a given distance in its widthwise direction was measured in accordance with the method described below, and the results obtained are shown in Table 1.

TABLE 1

| Distance from one end of the sheet in its widthwise direction (inches) | Light transmission (%) |
| --- | --- |
| 0–9 | 88.2 |
| 10 | 86.8 |
| 11 | 81.2 |
| 12 | 66.0 |
| 13 | 39.1 |
| 14 | 21.0 |
| 15 | 15.0 |
| 16 | 20.5 |
| 17 | 41.2 |
| 18 | 71.0 |
| 19 | 84.8 |
| 20 | 88.0 |
| 21–30 | 88.2 |

The light transmission was measured by means of a spectrophotometer. When there was no absorption of light, the light transmission was defined as 100 percent, and when there was no transmission of light, the light transmission was defined as 0 percent. Thus, the calculation was made on this basis. The wavelengths of 400 to 700 m$\mu$ were divided into 8 sections, and one specimen was subjected to the transmission measurement with respect to every one of these 8 sections. The eight data thus obtained were averaged.

Example 2

The procedure of Example 1 was repeated except that the manifold used was one in which the section cut by a plane intersecting the central axis of the manifold perpendicularly had the shape as shown in FIG. 5, and an injection port opened into the manifold was provided at a position 2 inches away from the center of the manifold as illustrated in FIG. 4. A polyvinyl butyral sheet having a band of dark green color 30 inches in width and 15 mils in thickness was obtained at a rate of 40 Kg/hr. The section of the sheet in its widthwise direction was as shown in FIG. 8-B. The color gradient of the color in the widthwise direction of the sheet was shown by the light transmission measurements given in Table 2 in the same manner as set forth in Example 1.

TABLE 2

| Distance from one end of the sheet in its widthwise direction (inches) | Light transmission (%) |
| --- | --- |
| 0–15 | 88.2 |
| 16 | 9.5 |
| 17 | 11.2 |
| 18 | 16.5 |
| 19 | 26.0 |
| 20 | 42.0 |
| 21 | 62.5 |
| 22 | 77.6 |
| 23 | 84.3 |
| 24 | 86.8 |
| 25–30 | 88.2 |

Example 3

The procedure of Example 1 was repeated except as noted hereinafter.

One injection port of an elliptic shape having a maximum width of 2 mm and a length of 16 mm, as shown in FIG. 6, was provided with its end near the center of the manifold being positioned at a point 2 inches away from the center of the manifold. The injection port was inclined against a dotted line being parallel to the central axis of the manifold and passing the center of the injection port 7b at an angle of 30° so that the end of the injection port near the center of the manifold was nearer to the die-land subsequent to the manifold. The amount of the colored plasticized polyvinyl butyral to be forced from the injection port was adjusted to 6 Kg/hr.

A polyvinyl butyral sheet having a band of color 30 inches in width and 15 mils in thickness was obtained at an extrusion rate of 41 Kg/hr. The section of the sheet was as shown in FIG. 8-C. The color gradient of the polyvinyl butyral sheet in its widthwise direction was very gentle. The light transmission measurements are given in Table 3.

TABLE 3

| Distance from one end of the sheet in its widthwise direction (inches) | Light transmission (%) |
| --- | --- |
| 0–16 | 88.2 |
| 17 | 12.0 |
| 18 | 14.1 |
| 19 | 20.0 |
| 20 | 29.0 |
| 21 | 37.9 |
| 22 | 47.0 |
| 23 | 57.0 |
| 24 | 67.8 |
| 25 | 76.5 |
| 26 | 82.8 |
| 27 | 86.7 |
| 28–30 | 88.2 |

What we claim is:

1. An apparatus for producing a thermoplastic resin sheet having a color band comprising
   a. an extrusion member including means for extruding a main stream of a thermoplastic resin, said extrusion member having
   b. a sheet-forming flat die and
   c. injection means for extruding a stream of a colored thermoplastic resin into the main stream of the resin in said die and associating said streams, said injection means including
   d. an injection port in said flat die for introduction of said colored thermoplastic resin, said flat die including
   e. an inlet for this main stream of resin,
   f. a mainfold,
   g. a substantially flat die-land surface adajacent and downstream of said manifold and terminating in
   h. a die lip, said manifold having a substantially flat surface adjacent said die-land at an angle of between 30° and 45° to said die-land, and said injection port is positioned in said substantially flat surface at a point at which the main resin stream is being spread laterally of the downstream flow.

2. An apparatus as set forth in claim 1 in which the injection port forms a circle on the angled surface.

3. An apparatus as set forth in claim 1 in which the injection port forms an ellipse.

4. An apparatus as set forth in claim 1 in which the injection port forms a crescent.

5. An apparatus as set forth in claim 3 in which the ellipse formed by the injecton port is asymmetrical and has one side along its major axis elongated with respect to the opposite side along the major axis.

6. An apparatus as set forth in claim 5 in which said asymmetrical ellipse is positioned so that one end of the ellipse is closer to the die-land that the opposite end of the ellipse, said closer ellipse-end is also closer to the center of the manifold, and said inlet for the main stream of resin is positioned substantially at the center of the manifold.

* * * * *